(12) United States Patent
Coatrieux et al.

(10) Patent No.: US 11,372,999 B2
(45) Date of Patent: Jun. 28, 2022

(54) METHOD FOR INSERTING DATA ON-THE-FLY INTO A WATERMARKED DATABASE AND ASSOCIATED DEVICE

(71) Applicant: INSTITUT MINES TELECOM, Palaiseau (FR)

(72) Inventors: Gouenou Coatrieux, Saint-Renan (FR); Javier Franco Contreras, Le Kremlin-Bicetre (FR)

(73) Assignee: Institut Mines Telecom, Palaiseau (FR)

( * ) Notice: Subject to any disclaimer, the term of this patent is extended or adjusted under 35 U.S.C. 154(b) by 356 days.

(21) Appl. No.: 16/463,363

(22) PCT Filed: Nov. 24, 2017

(86) PCT No.: PCT/EP2017/080426
§ 371 (c)(1),
(2) Date: May 22, 2019

(87) PCT Pub. No.: WO2018/096125
PCT Pub. Date: May 31, 2018

(65) Prior Publication Data
US 2019/0354711 A1    Nov. 21, 2019

(30) Foreign Application Priority Data
Nov. 25, 2016   (FR) ...................................... 1661526

(51) Int. Cl.
*G06F 21/62*    (2013.01)
*G06F 16/23*    (2019.01)
(Continued)

(52) U.S. Cl.
CPC ...... *G06F 21/6227* (2013.01); *G06F 16/2379* (2019.01); *G06F 21/16* (2013.01); *G06F 2221/0737* (2013.01); *H04L 9/0643* (2013.01)

(58) Field of Classification Search
CPC .. G06F 21/62; G06F 21/6227; G06F 16/2379; G06F 21/16; G06F 2221/0737; G06F 21/57; H04L 9/0643
See application file for complete search history.

(56) References Cited

U.S. PATENT DOCUMENTS

2004/0264736 A1* 12/2004 Parisis ................. G06T 1/0028
                                                         382/100
2006/0256868 A1* 11/2006 Westerman ............ H04N 19/17
                                                         375/240.24
(Continued)

OTHER PUBLICATIONS

Atallah, et al.,"Rights Protection for Relational Data, IEEE Transactions on Knowledge and Data . . . ," vol. 16, No. 12, Dec. 2004.
(Continued)

*Primary Examiner* — Malcolm Cribbs
(74) *Attorney, Agent, or Firm* — CRGO Global; Steven M. Greenberg

(57) ABSTRACT

The present invention proposes a method and associated device for inserting tuples into a watermarked database without having to remove the watermarking from all or a part of the database before inserting each tuple. To achieve this, the invention consists of storing, in watermarking metadata, the type of group or class wherein the tuples of the database have been distributed during the watermarking of the database. For each type of group or class, a rule defining a modification of the value of at least one property on which the watermarking is carried is also stored in the watermarking metadata, depending on an insertion force parameter. Each tuple to be inserted is watermarked by applying the modification rule according to the group to which the tuple belongs. Due to the rule used, the insertion of the watermarked tuple does not modify the type of group it belongs to.

9 Claims, 1 Drawing Sheet

Figure 1:
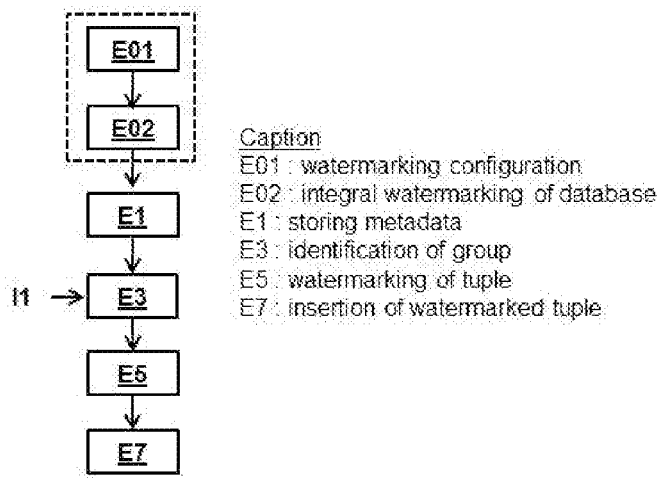

(51) Int. Cl.
    *G06F 21/16*           (2013.01)
    *H04L 9/06*            (2006.01)

(56)            References Cited

U.S. PATENT DOCUMENTS

| | | | |
|---|---|---|---|
| 2007/0140523 A1* | 6/2007 | Parisis | G06T 1/0028 |
| | | | 382/100 |
| 2014/0157439 A1 | 5/2014 | Ayzenshtat et al. | |
| 2014/0355754 A1* | 12/2014 | Leung | H04L 9/065 |
| | | | 380/28 |
| 2017/0237552 A1* | 8/2017 | Karame | H04L 9/0643 |
| | | | 380/28 |
| 2018/0096164 A1* | 4/2018 | Dageville | G06F 21/602 |
| 2018/0254906 A1* | 9/2018 | Tofts | G06F 21/51 |

OTHER PUBLICATIONS

Franco-Contreras, et al., "Robust Lossless Watermarking of Relational Databases Based on Circular . . . ," Info Forensics, IEEE, vol. 9, No. 3, Mar. 2014.

Theodoros Tzouramanis, "A Robust Watermarking Scheme for Relational Databases," ICITST, IEEE, Dec. 2011.

* cited by examiner

METHOD FOR INSERTING DATA ON-THE-FLY INTO A WATERMARKED DATABASE AND ASSOCIATED DEVICE

CROSS-REFERENCE TO RELATED APPLICATIONS

This application is a § 371 national phase entry of International Application No. PCT/EP2017/080426, filed Nov. 24, 2017, which claims priority to French Patent Application No. 1661526, filed Nov. 25, 2016.

1. FIELD OF THE INVENTION

The field of the invention is that of IT security and more specifically, the protection of databases.

2. PRIOR ART

Below, reference is made to databases as a particular form of structuring of one or more sets of data. The remainder of the description will apply equally to all types of databases that are likely to be watermarked and in particular to relational databases.

It is known to watermark the content of databases in order to ensure traceability of extracted data and to certify the authenticity of the user having extracted this data.

By definition, the watermarking of data refers to a technique consisting of inserting a marker (watermark) in the data to be protected. The watermark is a message containing security properties, such as a signature or an authentication code, making it possible for the owner of a database to trace the users who access this data, or to verify the integrity of the latter. The watermarking allows the user to access the information, while keeping it protected by the inserted watermark. The data in which the watermark has been inserted are said to be watermarked.

The property of reversibility is a characteristic specific to certain modes of watermarking which provides the possibility of removing the watermark from the watermarked data and recovering the original data, i.e. before application of the watermarking.

Robust and reversible methods for watermarking data have been presented by J. Franco-Contreras, G. Coatrieux, F. Cuppens, N. Cuppens-Boulahia, E. Chazard and C. Roux in "Robust and Reversible Watermarking for the Traceability of Relational Databases in Health", at the Congress on Research in Imaging and Technologies for Health (RITS) in April 2013, at Bordeaux in France. This document is referenced D1.

Conventionally, the insertion of data into a database requires watermarking to be removed from the entire database. Taking into account the limited processing capacities of current database management systems (e.g. processors and memories), this processing is particularly constraining for the insertion of data.

A problem which confronts a person skilled in the art during the updating of watermarked databases is that the inserting of new tuples or recording of data in the database cannot be performed "on-the-fly", i.e. it is not possible to insert new tuples without having to remove the watermarking beforehand from all or part of the database. Once the new data has been inserted, all or some of the data contained in the database is watermarked taking into account the new inserted data.

These operations of de-watermarking/watermarking are particularly disadvantageous because they require significant processing time, while the size of data to be inserted is generally relatively small (several kilobytes) compared with the volume of data contained in the database (several terabytes). Moreover, the integral de-watermarking of the database, even if it is temporary, must be avoided for security reasons.

Consequently, there is a real need to insert, in the minimum amount of time and securely, data contained in a watermarked database according to a watermarking mechanism, in particular reversible, without having to process the entire database.

From the document, *Rights Protection for Relational Data*, by Radu Sion, Mikhail Atallah and Sunil Prabhakar, published in IEEE Transactions on Knowledge and Data Engineering, vol. 16, no. 12, in December 2014, a watermarking method is known which is applied in a particular context, according to which different watermarked versions of a same original database are distributed to clients or collaborators. In this context, called "outsourcing", the owner of the database must always have access to the original data (i.e. a copy of the non-watermarked database on their internal server) and to the various servers where the watermarked databases are stored by the clients.

Thus, the implementation of the method according to D1 requires that the owner of the databases has permanent access to all of the original data as well as to the outsourced watermarked data.

As indicated in D1, in order to be able to guarantee that the updates of the database do not disturb the watermark, it is necessary to re-access the original data as well as the watermarked data.

More specifically, in the case of inserting a new record or tuple $t_u$, the owner of the database must (i) determine the group to which this tuple belongs (i.e. identify the group in which the tuple is intended to be inserted) and (ii) recover the watermarked data from this group in order to determine whether the addition of this new tuple, once watermarked, does not disturb/modify the value of the watermarking bits in the group of tuples in question.

If the insertion of the new tuple modifies the value of the watermarking bits of the group wherein the tuple is intended to be inserted, the owner must replace the watermarked data previously transmitted to the client by a new watermarked version obtained from the original data to which the new tuple has been added.

Such a method is constraining, given that it requires storing the original and watermarked data. In the context of Big Data, this data can represent very large quantities of information. Moreover, the method according to D1 is disadvantageous, as the operations described above must be carried out for each client, given that each copy of the original database is watermarked differently depending on the client considered.

Thus, the method described according to D1 is not considered to be a method for watermarking on-the-fly, in the sense that it requires access to all or part of the original data and/or to a part of the watermarked data.

3. AIM AND SUMMARY OF THE INVENTION

The present invention provides a solution which responds to the technical problem mentioned above by proposing a method for inserting at least one tuple in a database watermarked beforehand according to a watermarking mechanism, in particular reversible, wherein the tuples contained in said database are distributed in a set of groups or classes of tuples.

The method comprises the following steps:
storing of watermarking metadata comprising:
at least one property on which said watermarking is carried;
the type of group or class, selected from "carrier" or "non-carrier", of at least one symbol or bit to be encoded in said group or class;
a rule defining a modification of the value of said at least one property depending on a predefined insertion force parameter $\alpha$;
on receiving a first insertion request comprising said at least one tuple, identifying the group or class wherein said at least one tuple is intended to be inserted, among said set of groups or classes;
watermarking said at least one tuple, during which the value of said at least one property is modified according to said rule depending on the type of group or class identified, so as to obtain at least one modified tuple; and
sending a second insertion request comprising said at least one modified tuple, said rule being defined so as to preserve the type of the group or class following the insertion of said at least one modified tuple into the watermarked database.

The prior storage of the watermarking metadata advantageously makes it possible for watermarking on-the-fly of the new tuples to be inserted into the database, without having to remove watermarking from the entire database each time tuples are inserted.

Indeed, the watermarking metadata defines the way of modifying the value of the properties in the tuples to be watermarked, depending on the belonging thereof to a given group.

Using this previously stored data, the insertion of new tuples can be carried out on-the-fly, in a reduced time with respect to the conventional case where processing of the entire database is required in order to know how to modify the tuples when they are inserted into the database.

Thus, the present invention is particularly advantageous with respect to the method according to D1, given that it is not necessary to recover all or some of the watermarked data previously transmitted to the clients nor to have access to the original data, precisely as the watermarking metadata previously recorded during the storage step makes it possible to directly identify the modifications which must be carried out on the new tuple to be added or on the values of the properties thereof.

After having identified the group to which the new tuple belongs, the method according to the invention consults the previously stored watermarking metadata to identify the coding rule to be applied on the tuple depending on the type of group (e.g. group coding a bit '0' or a bit '1' or, for certain watermarking modulations, whether it relates to a carrier or non-carrier group) and the insertion force in order to carry out the appropriate modification.

Thus, using the method according to the invention, the updates are carried out on-the-fly, in other words directly on the added data without needing to access the original data or the watermarked data already transmitted to the clients.

According to a characteristic of the invention, the distribution of values of said at least one property in the group is modified according to said rule, such that the distribution of values obtained following the insertion of said at least one modified tuple is modified by a predefined quantity $\Delta$ depending on the insertion force $\alpha$, without modifying the type of the identified group.

Thus, the distribution of values of the property is modified without distorting the group, in other words without changing the type of the carrier and non-carrier groups.

According to another characteristic of the invention, if the group identified during the identification step is a carrier group of at least one bit or symbol to be inserted in said group, the value of said at least one property of said at least one tuple to be inserted is modified according to at least one coding rule for concealing said at least one bit or symbol in said group, said coding rule being defined beforehand and stored in the watermarking metadata. Thus, by systematically applying the same code, said at least one bit or symbol is inserted in the identified carrier group while preserving the carrier nature of this group (i.e. same type). In this way, it is ensured that the modification to be carried out on the value of the property in the tuple to be inserted, corresponds to that which was originally performed on the preceding tuples to code said at least one bit or symbol in the group. Consequently, new tuples can be inserted while avoiding reading errors during the extraction of tuples.

According to another characteristic of the invention, the method comprises a prior configuration step, during which a secret key is defined and watermarking parameters selected from among said at least one property to be watermarked, an insertion force, one or more group numbers of tuples to be generated, and a sequence of symbols to be concealed in said database.

According to another characteristic of the invention, the method comprises a prior step of integral watermarking of the database depending on the watermarking metadata. During the operation of integral watermarking of the database, the creation of different groups is carried out so as to obtain a uniform distribution of tuples.

According to another characteristic of the invention, the access to the watermarking metadata and the access to the database are respectively protected by distinct authentication data and/or identification data.

According to another characteristic of the invention, the read and write privileges associated with the watermarking metadata are not granted to a user of the database.

In a particular embodiment, the above-described method steps are determined by the instructions of computer programs.

Consequently, the invention also relates to a computer program on a data storage medium. This program, which is likely to be implemented by a microprocessor, comprises instructions suitable for implementing the steps of the method according to the invention.

This program can use any programming language, and be in the form of source code, object code, or code that is intermediate between source code and object code, such as in a partially compiled form, or in any other desirable form.

The invention also relates to a data storage medium that is readable by a microprocessor and comprising code instructions of a computer program such as mentioned above. This data storage medium is a removable or non-removable information storage means, that is partially or totally readable by a computer or a microprocessor.

The data storage medium can be any entity or device capable of storing the program. For example, the medium can comprise storage means, such as a ROM, for example a microcircuit ROM, or even a magnetic recording means, for example a hard drive or a flash memory.

On the other hand, the data storage medium can be a transmissible medium such as an optical or electrical signal, which can be rooted via an electrical or optical cable, by radio or by other means. In particular, the program according to the invention can be downloaded on a storage platform of an Internet-type network.

Alternatively, the data storage medium can be an integrated circuit into which the program is incorporated, the circuit being suitable for executing or for being used in the execution of the method in question.

The invention also relates to a server suitable for executing the instructions for implementing the steps of the method according to the invention, the instructions being able to be stored on a data storage medium included in the server or accessible by the latter.

The above-mentioned data storage medium, computer program and server have similar characteristics and advantages to the method which they implement.

Figure 2:
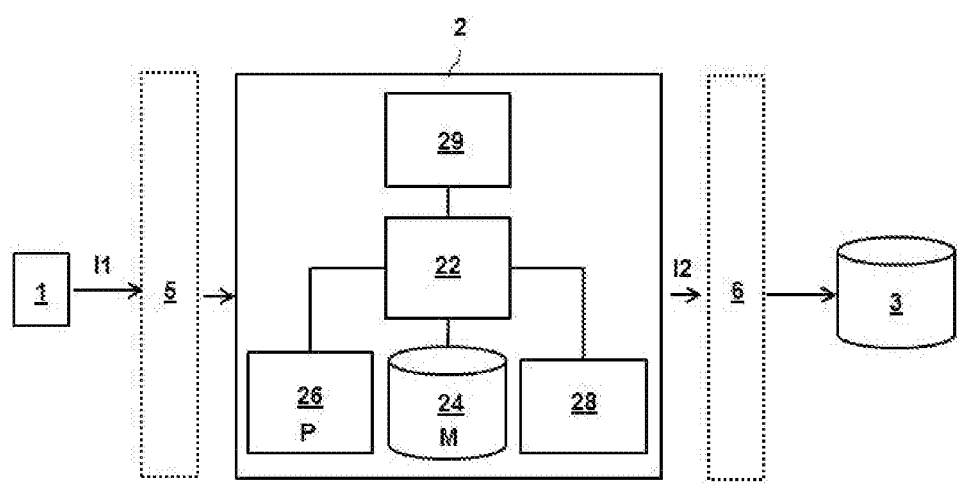

Other particularities and advantages of the invention will also appear in the description below in relation to the appended drawings, given by way of non-limiting examples:

FIG. 1 schematically illustrates the steps of the method according to an embodiment of the invention, and FIG. 2 schematically illustrates an example of a client-server system suitable for implementing the method according to the invention.

DEFINITIONS

Below, relational database will mean any data structure comprised of a finite number of relations or tables. Each table or relation is a database structure, grouping data on a specific subject, such as the stay of patients in a hospital.

Each table or relation comprises a set of N unordered tuples $\{t_u\}$ where N and u designate a natural number, where $1 \leq u \leq N$. Each tuple $t_u$ comprises a plurality of M properties designated $\{A_1, A_2, \ldots, A_i, \ldots, A_M\}$, where M designates a natural number. Each property $A_i$, for $1 \leq i \leq M$, takes values from within a predefined domain of values. The value of the $n^{th}$ property of the $u^{th}$ tuple is designated by $t_u.A_n$. Each tuple is identified in a unique manner by a primary key $t_u.PK$ which designates an property, a set of properties or the result of a function applied to a set of properties. Data designates any type of digital information that can be contained in a database, in particular a relational database.

By way of an illustrative and non-limiting example, below one single table is considered, designated by Table, comprising information relating to the stays of patients in a hospital, wherein a user authorised to modify the table inserts new tuples into it. The properties of this table comprise, in particular, the identifier of the stay "id_stay", the age "Age", and the duration of stay "Duration_stay" of patients having stayed at the hospital. Thus, a record of this table is constituted by a tuple comprising all of the values of the properties id_stay, Age, Duration_stay relating to a given stay, as schematically represented in Table 1 below which comprises N tuples, where each tuple corresponds to a row of the table.

In this example, the property Age takes a value in the interval [0-110]. The primary key is made up of the property id_stay which makes it possible for the unique extraction of the information relating to a particular stay among the set of stays recorded in the table.

TABLE 1

Example of a table: Table

| id_stay | Age | Duration_stay |
|---------|-----|---------------|
| Id1 | 13 | 6 |
| Id2 | 59 | 0 |
| Id3 | 67 | 22 |

By definition, reversible watermarking designates any digital technique for marking data that has the ability to delete from said data a previously inserted watermark for watermarking the data, so as to recover the original data, i.e. the data before applying the watermarking.

The examples described below relate to the case of a particular reversible watermarking mechanism. However, upon reading the description, a person skilled in the art will easily understand that the present invention can also be implemented for non-reversible watermarking mechanisms.

During a watermarking operation, the insertion of the watermark consists of modifying the values of certain properties $A_n$ of the database according to a marking force $\pm \alpha$, referred to as the insertion force, characterising the modification carried out on the value of the properties on which the watermarking is carried (i.e. properties to be watermarked). Below, the terms "insertion force" and "marking force" will be used interchangeably for designating the same quantity. The marking force $\alpha$ can be different for each watermarked property.

In the present example, it is assumed that the age of the patient is a watermarked property with a marking force a equal to $\pm 3$. For the tuple identified by Id1 in the watermarked database, the value of the age of the patient is equal to 13.

The watermarking metadata M is associated with the watermarking mechanism considered. This metadata comprises information defining the reversible watermarking mechanism implemented, making it possible, in particular, to adapt the marking automatically and to watermark the new records during updates of the database (e.g. insertion or deletion of tuples), which can be carried out by the administrator or authorised users.

In particular, this metadata comprises parameters of the process for inserting the watermark in the data to be watermarked, such as the insertion force used to modify the value of the watermarked properties during insertion of the watermark, the maximum and minimum values of the watermarked properties, and the values of sequences inserted in the data.

The metadata also comprises data independent of the watermarking method considered. They indicate, for example, the watermarked properties, the property or properties which comprise the primary key of the relation, the watermarked identifiers, the method for calculating digital signatures, etc.

4. DETAILED DESCRIPTION OF AN EMBODIMENT

An embodiment of the invention will be described jointly with reference to FIGS. 1 and 2 which respectively illustrate the steps of the method of inserting data on-the-fly and a system intended to implement said method according to the invention.

Device

In terms of equipment, the invention is implemented by a so-called "client-server" system comprising a client 1, a server 2 suitable for communicating with the client and a watermarked database 3 as illustrated in FIG. 2. More specifically, the steps of the insertion method according to the invention are implemented by the server 2. The watermarked database 3 can be remote from the server 2, in particular for reasons of security.

For example, the client 1 is implemented on a mobile terminal of a user, such as a computer, a mobile phone, a tablet, or any other type of device suitable for communicating with the server 2 via a telecommunications network (not illustrated).

The server 2 is implemented in any type of computer suitable for providing a database manager 6 with the instructions necessary for inserting or deleting data from the database 3, in response to the first data insertion requests 11 sent by the client 1 via a network interface 5 with a view to inserting new data into the watermarked database 3.

The server 2 comprises a processing unit 22 composed of at least one processor having one or more computing cores. This unit is responsible for the execution of computer programs being executed on the server 2 and, in particular, a computer program P comprising the instructions necessary for implementing the insertion method according to the invention.

The processing unit 22 is connected to a set of peripheral devices through a communication bus. The peripheral devices comprise at least one RAM module 28 constituting a working RAM for storing programs during execution and the data on which these programs work, such as insertion requests or extracted data.

The processing unit 22 is also connected to a network input/output module 29 which connects the server 2 to a communication network for communicating with the database manager 6.

Other peripheral devices such as an SSD drive (Solid State Drive) or flash memory drive can be connected to this same bus within the server 2. The bus in the current machines can be a PCIe bus (PCI Express). The processing unit 22 is also connected via a second communication bus to other peripheral devices such as permanent storage units such as hard drives, other input/output peripheral devices such as a USB interface, etc. In particular, the processing unit 22 is connected to a protected hard drive 24 intended to store the data substantially as watermarking metadata.

In the present embodiment, the server 2 is a trusted server that is physically distinct from the database manager 6. Given that the server 2 contains very sensitive information, such as the watermarking metadata, access to this data is protected by authentication and/or identification data that are distinct from those used for accessing the watermarked database 3. In particular, the read and write privileges associated with the watermarking metadata are not granted to a user of the database, but only to authorised, trusted persons. Any other method for protecting the watermarking metadata from internal or external threats can also be considered.

It is assumed that the database 3 comprises data which has been watermarked beforehand, at the time of the insertion thereof into the database, according to a reversible watermarking mechanism defined by the watermarking metadata M. In the present example, this metadata are stored on the hard drive 24 of the server 2.

Method

During an integral watermarking step E02, the set of tables or relations present in the database 3 are watermarked according to a known reversible watermarking mechanism.

As an illustrative example, the reversible watermarking mechanism can be considered which is based on circular histogram modulation as described in the article by Javier Franco-Contreras, Gouenou Coatrieux, Frédéric Cuppens, Nora Cuppens-Boulahia and Christian Roux, entitled "Robust Lossless Watermarking of Relational Databases based on Circular Histogram Modulation", published in *IEEE Transactions on Information Forensics and Security*, vol. 9, no. 3, March 2014. This document is referenced D2.

To simplify, the case is considered wherein the database 3 comprises one single table Table. To watermark the data contained in this table, the database owner defines, during a prior configuration step E01, a set of watermarking parameters, which includes information relating to the distribution of tuples into disjoint groups, information relating to the watermarking modulation used to modify the value of certain properties of tuples, and a message to be concealed (i.e. watermark) by application of the modulation. All of these parameters are stored as watermarking metadata M. In particular, the watermarking metadata comprise a watermarking secret key $K_W$, the designation of the watermarking properties, in other words properties on which the watermarking is carried.

In a known manner, the watermarking consists of encoding a message by inserting a sequence S of symbols or bits defining the message to be concealed. This encoding consists of modifying the value of certain properties of the tuples depending on the group to which they belong, according to a predefined coding rule. The property or properties on which the watermarking is carried are identified by the watermarking metadata M.

The integral watermarking step E02 comprises a first sub-step of creating groups of tuples and a second sub-step of modulation as described above.

Creation of Groups

Generally, the tuples of the table to be protected by the watermarking are distributed, in a uniform manner, into a set of $N_g$ separate groups $\{G_i\}$ with $1 \le i \le N_g$, where Ng designates the total number of groups of tuples of the database, this number being determined during the configuration step E01. For example, the number of the group $n_u$ to which a tuple $t_u$ belongs is determined as a function of the watermarking secret key $K_w$ and the primary key $t_u.PK$ of the tuple, by applying a cryptographic hashing function H of the SHA type (Secure Hash Algorithm) according to the following formula:

$$n_u = H(K_W | H(K_W | t.PK)) \bmod(N_g),\text{ where } | \text{ designates}$$
the concatenation operator and mod designates
the modulo mathematical function.

Modulation

Once the groups of tuples have been formed, at least one bit or symbol of a sequence S (message or watermark to be concealed in the database) is inserted in certain so-called "carrier" groups.

This sequence S is determined beforehand depending on the security property that it is desired to ensure (e.g. signature of the database to ensure the protection of all the data, identifier associated with a date for ensuring traceability, etc.). For example, the sequence S is a sequence of bits $\{S_i\}$ where $S_i$ is a bit selected in a pseudo-random manner from the set $\{0, 1\}$, i designating a natural number such that $1 \le i \le N_s$. In the particular case where $N_s = N_g$, all the groups are carriers. Normally, the following relation applies: $N_g > N_s$.

This sequence S can be stored in the watermarking metadata M. More generally, a piece of information identifying the value of said at least one symbol or bit $S_i$ to be inserted in each carrier group $G_i$ is recorded in combination with an identifier of the group considered. For example, in the watermarking metadata M, the bit "1" is recorded in combination with the identifier of the carrier group $G_1$ in order to indicate that the bit "1" is encoded within the group $G_1$. According to another example, the sign + for designating the bit "1" (respectively the sign − for designating the bit "0") is recorded in combination with the identifier of the carrier group G.

In the considered case of circular histogram modulation, for each group $G_i$, each of the tuples $t_u$ is also distributed in a subgroup selected from a set of two subgroups referenced $G_{A,i}$ and $G_{B,i}$. This subgroup is secretly determined by using the watermarking secret key $K_W$ recorded in the watermarking data, according to the following formula: $n_u = H(K_W|H(K_W|t_u.PK))\bmod(2)$. For example, the tuple $t_u$ is associated with the group $G_{A,i}$ if $H(K_W|t_u.PK))\bmod(2)=0$ or with the group $G_{B,i}$ if $H(K_W|t_u.PK))\bmod(2)=1$.

It is assumed that $A_n$ designates a digital property, on which the watermarking is carried, i.e. for which the value is modified according to the predefined rule as a function of the type of group to which the tuple belongs.

As described in document D2, for each group $G_i$, the distribution of values of the property $A_n$ is calculated and represented in the form of histograms projected on a same circle, for each of the two subgroups, $G_{A,i}$ and $G_{B,i}$. The first subgroup $G_{A,i}$ (respectively second subgroup $G_{B,i}$) is characterised by the centre of mass $C_{A,i}$ thereof (respectively $C_{B,i}$) with which the vector $V_{A,i}$ (respectively $V_{B,i}$) is associated as illustrated in FIG. 2 in document D2.

Carrier Groups

In the case where the group Gi is a carrier of at least one bit or symbol to be inserted in the group (encoding), the insertion process consists of modulating the angle $\beta_i$ formed by the two vectors $V_{A,i}$ and $V_{B,i}$ to insert (or encode) the bit $S_i=0$ or $S_i=1$, according to the coding rule expressed as a function of the insertion force $\alpha$ as follows:

$\beta_i^W = \beta_i - 2\alpha$ for inserting the bit $S_i=0$ or
$\beta_i^W = \beta_i + 2\alpha$ for inserting the bit $S_i=1$.

In an equivalent manner, the modulation of the angle $\beta_i$ by $\pm 2\alpha$ corresponds to a modification of the value of the property $A_n$ of $\pm \Delta$, such that $\Delta = \alpha \cdot L/(2\pi)$ where L designates the number of distinct values that the property $A_n$ can take on the histogram. The sign is defined as a function of the subgroup to which the tuple belongs as summarised in table 2 below:

TABLE 2

Rule for coding for a carrier group

| $S_i$ | $G_i$<br>$\beta_i^W = \beta i - 2\alpha \cdot (2S_i - 1)$ | $G_{A,i}$<br>$A_n + 2(S_i - 1)\Delta$ | $G_{B,i}$<br>$A_n + (1 - 2S_i)\Delta$ |
|---|---|---|---|
| 0 | $\beta_i^W = \beta_i - 2\alpha$ ($\beta_i^W < 0$) | $A_n - \Delta$ | $A_n + \Delta$ |
| 1 | $\beta_i^W = \beta_i + 2\alpha$ ($\beta_i^W > 0$) | $A_n + \Delta$ | $A_n - \Delta$ |

This coding rule applies to carrier groups complying with the relation $|\beta_i|<2\alpha$. The sign of the modulated angle $\beta_i^W$ modulated by the coding rule indicates the value of the encoded bit. Thus, $\beta_i^W<0$ in the case where $S_i=0$, while $\beta_i^W>0$ in the case where $S_i=1$.

According to a particularity of the invention, for each carrier group, a piece of information indicating the value of said at least one bit or symbol $S_i$ to be inserted is stored, during a step E1, in the watermarking metadata M, this information being stored in combination with the identifier of the carrier group or class. Thus, in the present example, for each carrier group $G_i$, the sign of the modulated angle $\beta_i^W$ is stored. The coding rule is also stored in the watermarking metadata during the storage step E1.

By storing beforehand, during storage step E1, in the watermarking metadata M, the identifiers of carrier groups and the sign associated with each group for encoding a bit, it is possible to watermark on-the-fly a new tuple intended to be inserted into the database.

Non-Carrier Groups

In the case where $|\beta_i|>2\alpha$, the group $G_i$ is a non-carrier group in the sense that the value of $\alpha$ is too low to change the sign $\beta_i^W$ so as to encode one or more bits or symbols $S_i$. Depending on the sign of the angle $\beta_i$, positive non-carrier groups for which $\beta_i>0$ are distinguished from negative non-carrier groups for which $\beta_i<0$. Depending on whether the tuple belongs to one of the two subgroups $G_{A,i}$ or $G_{B,i}$, the value of the angle $\beta_i$ is modified depending on the positive or negative character of the non-carrier group and depending on the insertion force $\alpha$, according to the following modification rule (see Table 3):

TABLE 3

Modification rule for a non-carrier group

| Sign of $\beta_i$ | Modification of $\beta_i$ | Modification of $A_n$ if tuple is in $G_{A,i}$ | Modification of $A_n$ if tuple is in $G_{B,i}$ |
|---|---|---|---|
| $\beta_i > 0$ | $\beta_i^W = \beta_i + 2\alpha$ | $A_n + \Delta$ | $A_n - \Delta$ |
| $\beta_i < 0$ | $\beta_i^W = \beta_i - 2\alpha$ | $A_n - \Delta$ | $A_n + \Delta$ |

According to a particularity of the invention, for each non-carrier group, the sign of the angle $\beta_i$ indicating whether the group is a positive or negative carrier, is stored during storage step E1 in the watermarking metadata M, this information being stored in combination with the identifier of the non-carrier group. Thus, in the present example, for each non-carrier group $G_i$, the sign of the angle $\beta_i$ is stored. The modification rule is also stored in the watermarking metadata during the storage step E1.

By storing beforehand, during storage step E1, in the watermarking metadata M, the identifiers of carrier groups and the sign associated with each group for encoding a bit, it is possible to modify the value of the property $A_n$ of a new tuple intended to be inserted on-the-fly into the database.

Overflow Group

In the case where $|\beta_i|>\pi-2\alpha$, the group is an overflow group. For this type of group, no modification is applied to the property $A_n$ of the tuples belonging to this type of group. Only one "overhead" is added to distinguish the overflow-type group from other types of groups.

The prior recording (step E1) in the watermarking metadata, of the group type (i.e. positive/negative carrier, non-carrier) and a rule for modifying or coding associated with this type of group in order to modify the value of the property to be watermarked, advantageously makes it possible for any new tuple to be inserted on-the-fly, without having to process the entire database.

In the present embodiment, the rule provided for modifying the value of the property $A_n$ consists of adding or subtracting $\Delta = \alpha \cdot L/(2\pi)$ to or from values that can take the property $A_n$ in a group (or subgroup) depending on the tuple belonging to this group (or subgroup). This modification is designed such that it makes it possible for the type of group with which a tuple is associated to be preserved during the insertion thereof into the database. This modification rule is given as an illustrative example. Naturally, a person skilled in the art will be able to consider other beneficial rules.

It is assumed that the database is integrally watermarked during a prior integral watermarking step E02 according to the watermarking metadata (M). At the end of the step, the tuples are distributed in a uniform manner into a set of groups, some of which are carriers of a bit of the concealed message.

It is assumed that a user having write privileges on the database 3 transmits, by means of their client terminal, a first insertion request $I_1$ in order to insert a new tuple $t_u$ into said database. For example, this tuple is made up of the following three properties: id_stay=Id4; Age=12; duration_stay=4 that will be designated by {4; 12; 4} below.

Upon receiving this first insertion request $I_1$, the server 2 determines, by consulting the watermarking metadata M, whether the tuple comprises at least one property on which the watermarking must be carried.

In the present example, the server 2 identifies that the properties age and duration_stay are properties respectively watermarked with an insertion force ±3 and ±2 and that three groups are formed: a first carrier group encoding a bit '1' (group 1), a second carrier group encoding a bit '0' (group 2) and a third carrier group encoding a bit '1' (group 3).

During an identification step E3, the server 2 identifies the group into which the tuple is intended to be inserted from the set of groups identified in the watermarking metadata. The identifier of the group into which the new tuple must be inserted is determined from the primary key of the tuple $t_u$ and from the watermarking key, by means of a cryptographic hashing function as described above. Based on this identifier, the server determines the type of group and the corresponding rule for modifying the value of the property to be watermarked $A_n$.

In the present example, the server identifies during the identification step E3 that group 1 is a carrier group encoding a bit '1', group 2 is a carrier group encoding a bit '0' and the group 3 is a carrier group encoding a bit '1'. The tuple to be inserted {4; 12; 4} belongs to the second group $G_{i=2}$ and to the subgroup A of this second group ($G_{A,i}$) where i=2.

During a watermarking step E5, the server 2 determines, depending on the type of group identified, the rule to be applied for the tuple to be inserted, by consulting the watermarking metadata M. Several cases arise depending on the type of groups.

If the identified group is a carrier group ($|\beta_i|<2\alpha$), the distribution of values of the property $A_n$ is modified by $\pm\Delta$ depending on the tuple belonging to one of two subgroups $G_{A,i}$, $G_{B,i}$ and on the symbol $S_i$ coded in the group according to the coding rule defined in the watermarking metadata.

If the bit to be encoded in the group $G_i$ is $S_i=0$, the distribution of values of the property $A_n$ in the subgroup $G_{A,i}$ is modified by $-\Delta$ while the distribution of values of the property $A_n$ in the subgroup $G_{B,i}$ is modified by $+\Delta$. This modification corresponds to a modulation of the angle $\beta_i$ by $-2\alpha$ between the two histograms distributed on the circle, so that the value of the watermarked angle (i.e. modified by the watermarking) is $\beta_i^W=\beta_i-2\alpha$.

By contrast, if the bit to be encoded in the group $G_i$ is $S_i=1$, the distribution of values of the property $A_n$ in the subgroup $G_{A,i}$ is modified by $+\Delta$ while the distribution of values of the property $A_n$ in the subgroup $G_{B,i}$ is modified by $-\Delta$. This modification corresponds to a modulation of the angle $\beta_i$ by $+2\alpha$ between the two histograms distributed on the circle, such that the value of the watermarked angle (i.e. modified by the watermarking) is $\beta_i^W=\beta_i+2\alpha$.

Having previously identified the carrier groups, the value of the property $A_n$ on which the watermarking is carried for encoding of the bit associated with the group can be directly modified, given that the systematic application of the coding rule associated with this type of group preserves the nature of the group.

If the identified group is a non-carrier group ($|\beta_i|>2\alpha$), the server 2 identifies, depending on the sign of the angle $\beta_i$, whether the group is positive non-carrier ($\beta_i>0$) or if the group is negative non-carrier ($\beta_i<0$). The distribution of values of the property $A_n$ is modified by $\pm\Delta$ depending on the positive/negative character of the group, according to the rule defined in the watermarking metadata.

In the case of a positive non-carrier group ($\beta_i>0$), the distribution of values of the property $A_n$ in the subgroup $G_{A,i}$ is modified by $+\Delta$ and the distribution of values of the property $A_n$ in the subgroup $G_{B,i}$ is modified by $-\Delta$, as indicated in table 3. This modification corresponds to a modulation of the angle $\beta_i$ by $+2\alpha$, such that the value of the watermarked angle (i.e. modified by the watermarking) is $\beta_i^W=\beta_i+2\alpha$.

By contrast, in the case of a negative non-carrier group ($\beta_i<0$), the distribution of values of the property $A_n$ in the subgroup $G_{A,i}$ is modified by $-\Delta$ and the distribution of values of the property $A_n$ in the subgroup $G_{B,i}$ is modified by $+\Delta$, as indicated in table 3. This modification corresponds to a modulation of the angle $\beta_i$ by $-2\alpha$, such that the value of the watermarked angle (i.e. modified by the watermarking) is $\beta_i^W=\beta_i-2\alpha$.

Having previously identified the carrier groups, the value of the property $A_n$ on which the watermarking is carried can be directly modified, given that the systematic application of the modification rule associated with this type of group preserves the nature of the group.

In all cases, the prior storage of the type of group and of a rule associated with this type of group for modifying the value of the property $A_n$ designated as watermarked property during the storage step E1, makes possible the insertion of the tuple $t_u$ on-the-fly without having to perform a processing on the entire watermarked database. In other words, by knowing beforehand how to modify the value of the properties on which the watermarking for each new tuple to be inserted is carried, it is possible to process the new tuples one by one, without having to remove the watermarking from the entire database. This is particularly advantageous for reducing the time necessary for the updating of very large watermarked databases.

In the present example, during the watermarking step E5, the server 2 identifies that the group $G_i=2$ wherein the new tuple {4; 12; 4} is intended to be inserted is a carrier group, for which the coding rule is implemented for each of the two watermarked properties age and duration_stay, as described below.

For the watermarked property age, the original value 12 is modified by −3 given that the insertion force for the property age is equal to 3, the group to which the considered tuple belongs is a carrier group encoding a bit '0' (i.e. group 2) and that the tuple belongs to the subgroup A (i.e. $G_{A,2}$). Consequently, the final value of the age recorded in the database is 9 (i.e. corresponding to the value $A_n-\Delta$ in table 2 at line $S_i=0$ and column $G_{A,i}$ with $A_n=12$ and $\Delta=3$).

For the watermarked property duration_stay, the original value 4 is modified by −2 given that the insertion force for the property duration_stay is equal to 2. The group to which the considered tuple belongs is a carrier encoding a bit '0' (i.e. group 2). The tuple belongs to subgroup A. Consequently, the final value of the age recorded in the database is 2 (i.e. corresponding to the value $A_n-\Delta$ in table 2 at line $S_i=0$ and column $G_{A,i}$, with $A_n=4$ and $\Delta=2$).

During the watermarking step E5, the server 2 modifies the value of the properties according to the above rules so as to obtain the watermarked tuple {4; 9; 2}.

Then, the server 2 generates and sends, to the database manager 6, during a sending step E7, a second insertion request I2 comprising said watermarked tuple (e.g. {4; 9; 2}). Receiving the second request I2, the database manager 6 inserts the watermarked tuple into the watermarked database. In the present example, it follows that the values of the properties age and duration_stay is modified as indicated in the updated table below (see Table 4):

TABLE 4

| Id_stay | Age | Duration_stay |
|---------|-----|---------------|
| 1 | 13 | 6 |
| 2 | 59 | 0 |
| 3 | 67 | 22 |
| 4 | 9 | 2 |

Thus, the application of the modification or coding rule makes it possible for the insertion of a new tuple without disturbing the already existing watermarking, i.e. without causing the distortion of the watermark in the watermarked database.

Naturally, to satisfy specific needs, a competent person in the field of the invention will be able to apply modifications to the preceding description.

Although the present invention has been described above with reference to a specific embodiment, the present invention is not limited to this specific embodiment alone, and the modifications that are in the field of application of the present invention will be clear to a person skilled in the art.

The invention claimed is:

1. A method for inserting at least one tuple into a database watermarked beforehand according to a watermarking mechanism, wherein the tuples contained in said database are distributed in a set of groups or classes of tuples, said method comprising:
storing watermarking metadata comprising:
at least one property on which said watermarking is carried;
a type of group or class, selected from carrier or non-carrier, of at least one symbol or bit to be encoded in said group or class;
a rule defining a modification of a value of said at least one property depending on a predefined insertion force parameter;
on receiving a first insertion request comprising said at least one tuple, identifying the group or class into which said at least one tuple is intended to be inserted, among said set of groups or classes;
watermarking said at least one tuple, during which the value of said at least one property is modified according to said rule depending on the type of group or class identified, so as to obtain at least one modified tuple; and
sending a second insertion request comprising said at least one modified tuple, said rule being defined so as to preserve the type of the group or class following an insertion of said at least one modified tuple into the watermarked database.

2. The method according to claim 1, wherein the distribution of values of said at least one property in the group is modified according to said rule, such that the distribution of values obtained following the insertion of said at least one modified tuple is modified by a predefined quantity-depending on the insertion force, without modifying the type of the identified group.

3. The method according to claim 1, wherein if the group identified during the identification step is a carrier group of at least one bit or symbol to be inserted into said group, the value of said at least one property of said at least one tuple to be inserted is modified according to at least one coding rule for concealing said at least one bit or symbol in said group, said coding rule being defined beforehand and stored in the watermarking metadata.

4. The method according to claim 1, wherein the method comprises a prior configuration, during which a secret key and watermarking parameters selected from said at least one property to be watermarked, an insertion force, one or more group numbers of tuples to be generated, and a sequence of symbols to be concealed in said database, are defined.

5. The method according to claim 1, wherein the method comprises a prior integral watermarking of the database depending on the watermarking metadata.

6. The method according to claim 1, wherein the access to the watermarking metadata and the access to the database are respectively protected by distinct authentication data and/or identification data.

7. The method according to claim 6, wherein the read and write privileges associated with the watermarking metadata are not granted to a user of the database.

8. A computer program product comprising a non-transitory computer readable storage medium storing thereon computer usable instructions executable by a computer processor in memory of a computer, and when executed, perform
storing watermarking metadata comprising:
at least one property on which said watermarking is carried;
a type of group or class, selected from carrier or non-carrier, of at least one symbol or bit to be encoded in said group or class;
a rule defining a modification of a value of said at least one property depending on a predefined insertion force parameter;
on receiving a first insertion request comprising at least one tuple, identifying the group or class into which said at least one tuple is intended to be inserted, among said set of groups or classes;
watermarking said at least one tuple, during which the value of said at least one property is modified according to said rule depending on the type of group or class identified, so as to obtain at least one modified tuple; and
sending a second insertion request comprising said at least one modified tuple, said rule being defined so as to preserve the type of the group or class following an insertion of said at least one modified tuple into the watermarked database.

9. A server computer comprising memory and a processor, the computer executing computer program instructions suitable for performing:
storing watermarking metadata comprising:
at least one property on which said watermarking is carried;
a type of group or class, selected from carrier or non-carrier, of at least one symbol or bit to be encoded in said group or class;
a rule defining a modification of the value of said at least one property depending on a predefined insertion force parameter;
on receiving a first insertion request comprising at least one tuple, identifying the group or class into which said at least one tuple is intended to be inserted, among a set of groups or classes;
watermarking said at least one tuple, during which the value of at least one property is modified according to said rule depending on the type of group or class identified, so as to obtain at least one modified tuple; and
sending a second insertion request comprising at least one modified tuple, said rule being defined so as to preserve the type of the group or class following an insertion of said at least one modified tuple into the watermarked database.

* * * * *